United States Patent
Scoville et al.

(10) Patent No.: US 10,851,952 B2
(45) Date of Patent: Dec. 1, 2020

(54) REFLECTIVE INK LIGHTING ASSEMBLY

(71) Applicant: Flex-N-Gate Advanced Product Development, LLC, Tecumseh (CA)

(72) Inventors: Jonathan Scoville, Hudsonville, MI (US); Les Sullivan, Wyoming, MI (US)

(73) Assignee: Flex-N-Gate Advanced Product Development, LLC, Tecumseh (CA)

(*) Notice: Subject to any disclaimer, the term of this patent is extended or adjusted under 35 U.S.C. 154(b) by 5 days.

(21) Appl. No.: 16/272,191

(22) Filed: Feb. 11, 2019

(65) Prior Publication Data

US 2019/0249834 A1 Aug. 15, 2019

Related U.S. Application Data

(60) Provisional application No. 62/630,934, filed on Feb. 15, 2018.

(51) Int. Cl.
  *F21K 9/68* (2016.01)
  *F21V 7/28* (2018.01)
  (Continued)

(52) U.S. Cl.
  CPC ............. *F21K 9/68* (2016.08); *B60Q 1/302* (2013.01); *C09D 11/03* (2013.01); *F21V 7/0091* (2013.01); *F21V 7/05* (2013.01); *F21V 7/28* (2018.02); *G09F 13/18* (2013.01); *G09F 2013/044* (2013.01); *G09F 2013/049* (2013.01); *G09F 2013/222* (2013.01); *G09F 2013/227* (2013.01)

(58) Field of Classification Search
  CPC .. F21S 43/26; F21S 43/33; F21S 43/40; F21S 43/239; F21S 43/245; F21S 43/249; F21S 43/14; F21K 9/68; G09F 13/18; G09F 2013/227; F21V 7/05; F21V 7/28
  See application file for complete search history.

(56) References Cited

U.S. PATENT DOCUMENTS 3,553,869 A * 1/1971 Dickinson ............... G09F 13/06
                                                            40/559
6,632,506 B1 * 10/2003 Grall ....................... G02B 5/128
                                                            428/141
(Continued)

FOREIGN PATENT DOCUMENTS

EP      2746647 A2    12/2013
JP    2014021400 A     2/2014
(Continued)

OTHER PUBLICATIONS

European Related Patent Application 19157313.8 Extended Search Report dated Oct. 7, 2019.

*Primary Examiner* — Tracie Y Green
(74) *Attorney, Agent, or Firm* — Erise IP, P.A.

(57) ABSTRACT

A reflective-ink lighting assembly includes a light transferring medium, a reflective-ink marking in the light transferring medium, and a light source adapted to insert light into the light transferring medium. In a lit state, light from the light source propagates through the light transferring medium by total-internal reflection. As propagated light reflects off the reflective-ink marking, some light exits through a façade of the light transferring medium to produce an illuminated marking. In an unlit state, the reflective-ink marking remains visible due to ambient light reflecting off the reflective-ink marking.

20 Claims, 3 Drawing Sheets

(51) Int. Cl.
    *C09D 11/03*     (2014.01)
    *F21V 7/05*     (2006.01)
    *F21V 7/00*     (2006.01)
    *B60Q 1/30*     (2006.01)
    *G09F 13/18*     (2006.01)
    G09F 13/04     (2006.01)
    G09F 13/22     (2006.01)

(56) References Cited

U.S. PATENT DOCUMENTS

| | | | |
|---|---|---|---|
| 7,804,418 B2 | 9/2010 | Sullivan et al. | |
| 7,810,266 B2 * | 10/2010 | Arnthorsson | G09F 13/04 40/541 |
| 10,443,790 B2 | 10/2019 | George et al. | |
| 2001/0040393 A1 | 11/2001 | Sano et al. | |
| 2003/0205895 A1 * | 11/2003 | Scarbrough | B44F 7/00 283/91 |
| 2010/0163317 A1 * | 7/2010 | Tai | G06F 3/03547 178/18.09 |
| 2011/0273906 A1 * | 11/2011 | Nichol | G02B 6/0076 362/607 |
| 2015/0246636 A1 * | 9/2015 | Shigaki | B60Q 1/56 40/206 |
| 2017/0314759 A1 | 11/2017 | Nykerk et al. | |
| 2018/0252403 A1 | 9/2018 | Hamid et al. | |
| 2018/0274745 A1 | 9/2018 | Nykerk et al. | |
| 2019/0027326 A1 * | 1/2019 | Tsai | H01H 9/182 |
| 2019/0241013 A1 * | 8/2019 | Hyvonen | B44F 1/066 |
| 2019/0309924 A1 | 10/2019 | Nykerk et al. | |

FOREIGN PATENT DOCUMENTS

| | | |
|---|---|---|
| OA | 10757 A | 12/2002 |
| WO | 0171248 A1 | 9/2001 |

\* cited by examiner

REFLECTIVE INK LIGHTING ASSEMBLY

CROSS-REFERENCE TO RELATED APPLICATIONS

This application claims the benefit of U.S. Provisional Patent Application Ser. No. 62/630,934, entitled Reflective Ink Lighting Assembly and filed Feb. 15, 2018, the disclosure of which is herein incorporated by reference in its entirety.

BACKGROUND

1. Field of the Disclosure

Embodiments of this disclosure relate generally to the field of light assemblies for use in vehicles. More specifically, embodiments of this disclosure include markings used in combination with a light source within the light assemblies.

2. Description of the Related Art

U.S. Pat. No. 7,804,418 to Sullivan et al. discloses a light assembly for a vehicle that includes a lens having one or more ink markings. At least a portion of the ink marking is configured such that it appears generally opaque to a viewer when unlit, while not appearing opaque when lit by a light source in the light assembly.

European Patent Application 2,746,647 to George et al. discloses a light pipe assembly that enables a uniform emitted light intensity along its length while being lit with a single localized light source.

SUMMARY

In an embodiment, a reflective-ink lighting assembly includes a light transferring medium, a reflective-ink marking provided on the light transferring medium, and a light source adapted to insert light into the light transferring medium in a lit state, such that the light propagates through the light transferring medium by total-internal reflection to illuminate the reflective-ink marking. In an unlit state, the reflective-ink marking remains visible in the presence of ambient light.

In another embodiment, a lighting assembly includes a reflective-ink marking printed on an inner side of a light transferring medium, and a light source adapted to propagate light through the light transferring medium. Propagated light reflects off the reflective-ink marking and exits through a façade of the light transferring medium.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

In certain lighting applications, markings (e.g., logos, designs, emblems, geometric shapes, graphics, text, etc.) may be incorporated into a light assembly for producing a desired visual effect. Incorporating markings into vehicle light assemblies is complicated by photometric requirements of particular vehicle lights. For example, vehicle brake light assemblies must provide a specific total illumination surface area and illumination intensity. Embodiments of the present disclosure incorporate a reflective ink in the markings.

To provide a desired visual effect, markings may be arranged in an image set. In certain embodiments, the image set is provided on an individual light transferring medium or a plurality of light transferring media layered upon one another to form a stackup of images.

An exemplary process for transferring an image set onto light transferring media is pad printing. U.S. Pat. No. 7,804,418 to Sullivan et al., the disclosure of which is hereby incorporated by reference in its entirety, provides an exemplary pad printing process for applying markings to lighting assemblies.

Figure 1:
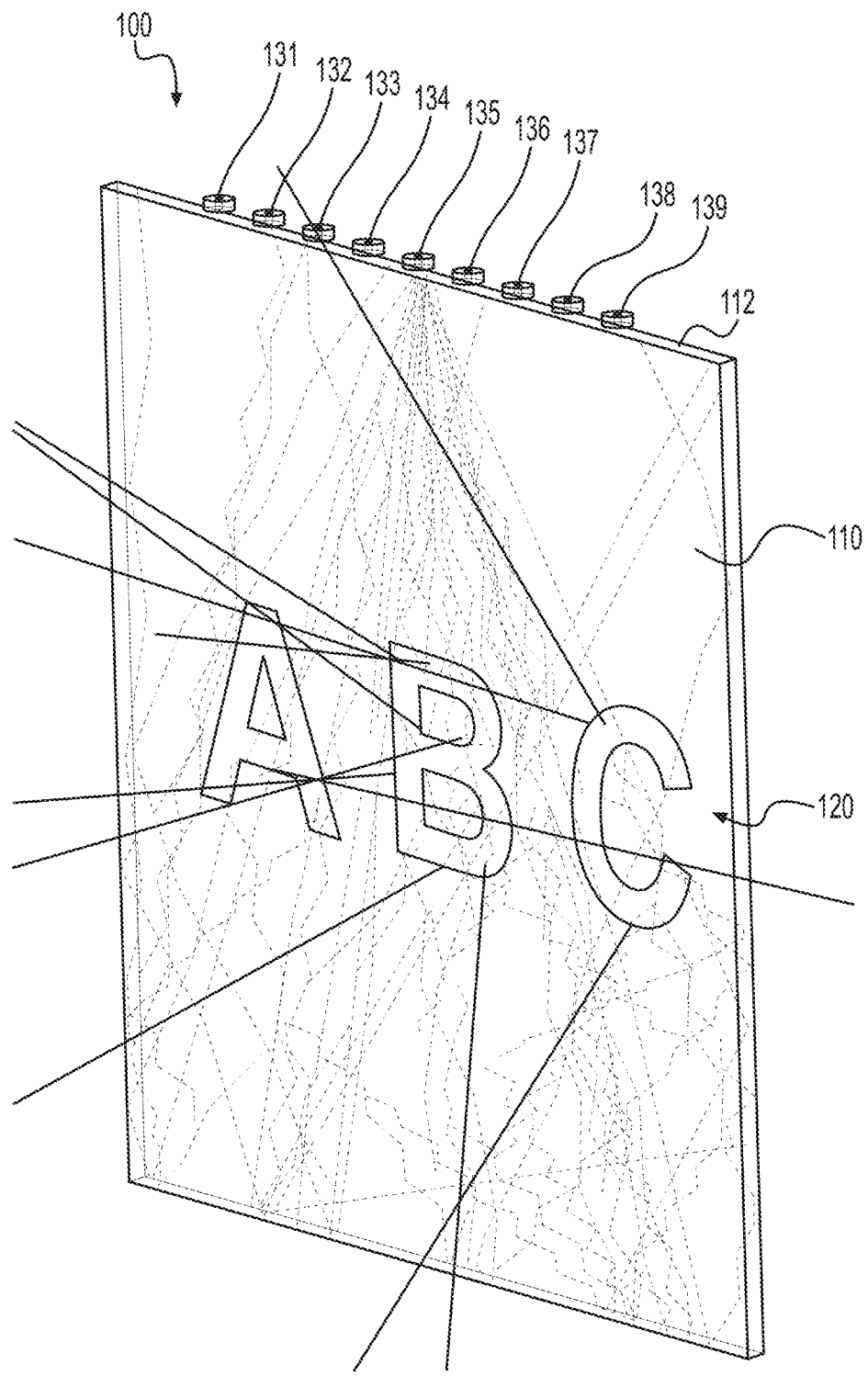
FIG. 1 is a perspective view of a reflective ink lighting assembly, in an embodiment.

FIG. 1 is a perspective view of an exemplary reflective ink lighting assembly 100. Lighting assembly 100 includes a light transferring medium 110 having a marking 120 (e.g., "A B C") printed with reflective ink on an inner side of light transferring medium 110. Examples of light transferring medium 110 include a light guide or light pipe in which light propagates through the medium via total-internal reflection (TIR). The reflective ink is applied to the opposite side of the lighting assembly 100 from the desired direction of light propagation. In other words, the reflective ink is applied to an inner far side of light transferring medium 110 for light to propagate from a near side of light transferring medium 110, as depicted in FIG. 1. Light is introduced into light transferring medium 110 along an edge (e.g., along a top edge 112) via a light source. The light source may include one or more light-emitting diodes (LEDs). In the embodiment depicted in FIG. 1, the light source includes an array of LEDs 131-139.

Light from the one or more LEDs propagates through light transferring medium 110 via TIR. As depicted in FIG. 1, light emitted from only a single LED 135 is shown for clarity of illustration. Exemplary rays of internal light are illustrated with dashed lines and exemplary rays of external light are illustrated with solid lines. Note that some rays of light are frustrated out of a façade (e.g., a forward-facing side) of light transferring medium 110 by reflecting off of reflective ink marking 120. The term "façade" as used herein should be interpreted broadly, in that it is intended to include any portion of the assembly that might be viewed while lighting assembly 100 is in operation. The resulting beam pattern is formed by the reflective ink. In other words, if no reflective ink were provided, no marking would be illuminated as there would be nothing to direct light out of the façade of light transferring medium 110.

Figure 2:
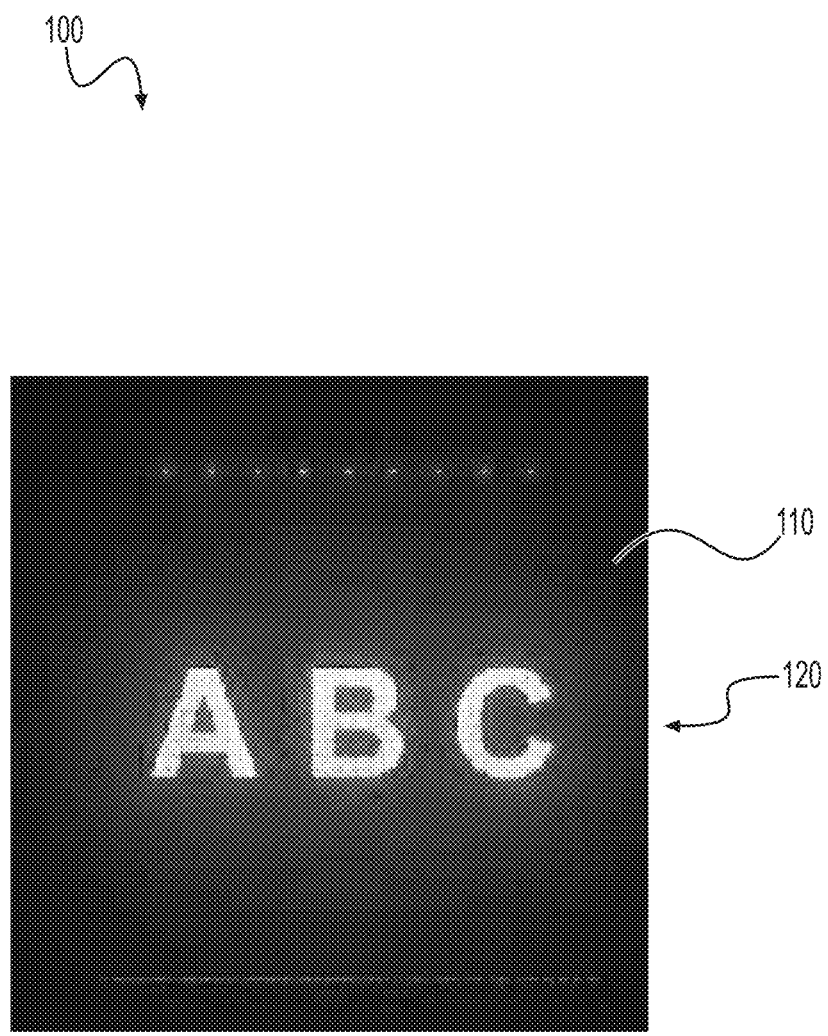
FIG. 2 shows an embodiment of an illuminated marking of a reflective ink lighting assembly in a lit state.

FIG. 2 shows an exemplary marking 120 of reflective ink lighting assembly 100 in a lit state. As depicted in FIG. 2, no external or ambient light is present. When the light source of lighting assembly 100 is on, the lit state is achieved. In the lit state, light from the light source is inserted into light transferring medium 110, which illuminates the ink. In other words, light travelling through light transferring medium 110 via TIR reflects off of the reflective ink, which makes marking 120 (e.g., "A B C") visible. In certain embodiments, color-matched inks may be used in the markings and coupled with a plurality of colored LEDs to make separate portions of the image set illuminate depending on which LEDs are turned on.

Upon illumination in the lit state, the reflective ink frustrates the TIR light causing it to exit the light transferring media. This causes the image set of the marking to glow substantially homogenously. In certain embodiments, a beam pattern resulting from illumination provides an intensity, a size, and a shape that meets legal automotive signal lamp photometric requirements. By modulating the density of the ink applied, advantageous visual effects are provided, such as shadowing and/or creating a perception of depth.

Certain embodiments of the present disclosure may be used to improve lighting efficiency of the lighting assemblies. For example, a total amount of usable light may be increased for a given amount of light provided (e.g., from a light source) by printing reflective ink on particular (e.g., non-essential) exit faces. Instead of exiting the lighting assembly via non-beneficial surfaces, light is reflected back into the light transferring media.

Figure 3:
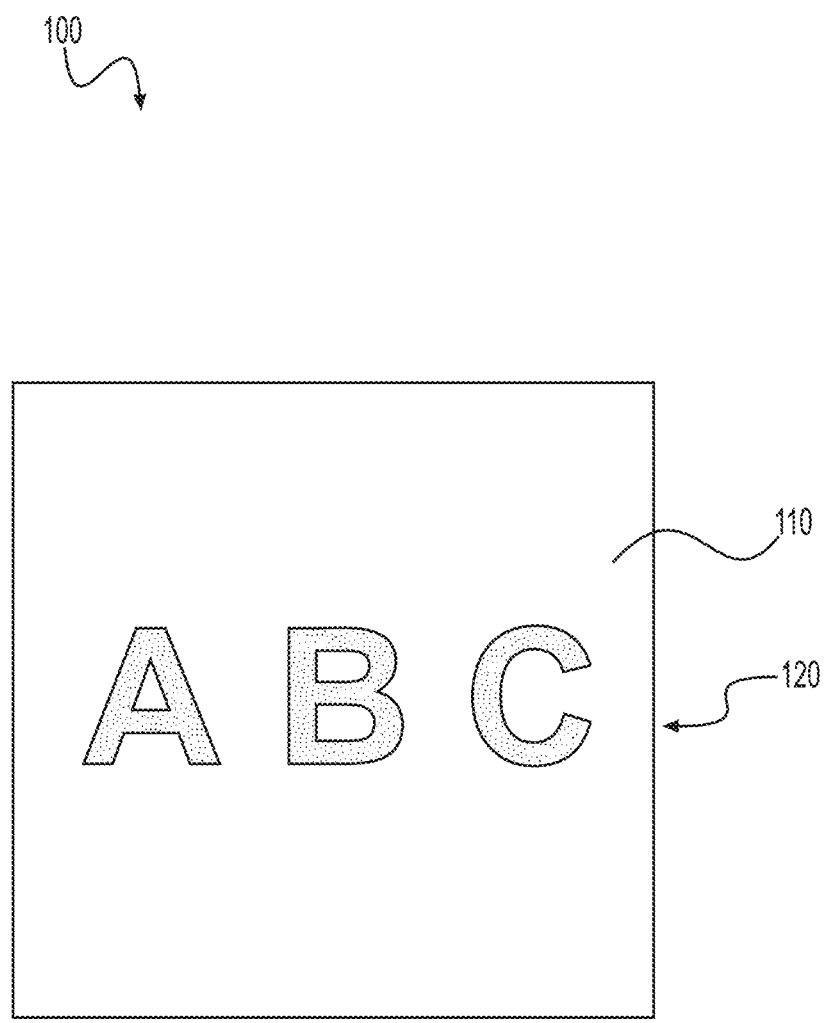
FIG. 3 shows an embodiment of the marking of FIG. 2 with the reflective ink lighting assembly in an unlit state.

FIG. 3 shows marking 120 when reflective ink lighting assembly 100 is in an unlit state. The unlit state is achieved when an internal light source of the lighting assembly is off. As depicted in FIG. 3, external or ambient light is present such that marking 120 (e.g., "A B C") is visible. Note that the bright spot overlapping the "B" of the marking is an artifact of the rendering. The reflective nature of the ink enables the images of the markings to appear visible when the lighting assembly is in the unlit state. Ambient light may enter via transparent or semi-transparent portions of the lighting assembly such as one or more lenses. The ambient light reflects off the reflective ink making it externally visible through the transparent or semi-transparent portion.

By varying the density of ink applied in the markings, the unlit appearance of the markings may be customized. For example, denser ink applications appear opaque, while lighter ink applications appear milky or translucent. The density of ink may be adjusted by varying the thickness of ink layers or by printing a dot matrix, for example.

Features described above as well as those claimed below may be combined in various ways without departing from the scope hereof. The following examples illustrate some possible, non-limiting combinations:

(A1) A reflective-ink lighting assembly includes a light transferring medium, a reflective-ink marking provided on the light transferring medium, and a light source adapted to insert light into the light transferring medium in a lit state, such that the light propagates through the light transferring medium by total-internal reflection to illuminate the reflective-ink marking. In an unlit state, the reflective-ink lighting assembly is configured such that the reflective-ink marking remains visible in the presence of ambient light.

(A2) For the reflective-ink lighting assembly denoted as (A1), the reflective-ink marking may be applied via pad printing.

(A3) For the reflective-ink lighting assembly denoted as either (A1) or (A2), the reflective-ink marking may be applied on an inner far side of the light transferring medium opposite a desired direction of light propagation.

(A4) For the reflective-ink lighting assembly denoted as any of (A1) through (A3), the light source may introduce light into the light transferring medium along an edge of the light transferring medium.

(A5) For the reflective-ink lighting assembly denoted as any of (A1) through (A4), the light source may include one or more light-emitting diodes.

(A6) For the reflective-ink lighting assembly denoted as any of (A1) through (A5), the light source may include an array of light-emitting diodes.

(A7) For the reflective-ink lighting assembly denoted as any of (A1) through (A6), in the lit state, rays of light may be frustrated out of a façade of the light transferring medium by reflecting off of the reflective-ink marking such that the reflective-ink marking is visible in the absence of ambient light.

(A8) For the reflective-ink lighting assembly denoted as any of (A1) through (A7), ambient light may enter the lighting assembly via transparent or semi-transparent portions of the reflective-ink lighting assembly and reflect off the reflective-ink marking making it externally visible through the façade.

(A9) For the reflective-ink lighting assembly denoted as any of (A1) through (A8), a beam pattern resulting from illumination in the lit state may provide an intensity, a size, and a shape that meets legal automotive signal lamp photometric requirements.

(A10) For the reflective-ink lighting assembly denoted as any of (A1) through (A9), reflective ink may be printed on non-essential exit faces of a lighting assembly to increase a total amount of usable light by reflecting light back into the light transferring medium thereby increasing a light efficiency of the lighting assembly.

(A11) For the reflective-ink lighting assembly denoted as any of (A1) through (A10), the reflective-ink marking may further include an image set provided on the light transferring medium.

(A12) For the reflective-ink lighting assembly denoted as any of (A1) through (A11), the image set may be provided on a plurality of light transferring media layered upon one another to form a stackup of images.

(A13) For the reflective-ink lighting assembly denoted as any of (A1) through (A12), the image set may glow substantially homogenously when illuminated in the lit state.

(A14) For the reflective-ink lighting assembly denoted as any of (A1) through (A13), the light source may include colored light-emitting diodes providing a plurality of colors and the markings may include color-matched inks to enable separate portions of the image set to be illuminated via the colored light-emitting diodes.

(B1) A lighting assembly includes a reflective-ink marking printed on an inner side of a light transferring medium, and a light source adapted to propagate light through the light transferring medium. Propagated light reflects off the reflective-ink marking and exits through a façade of the light transferring medium.

(B2) For the lighting assembly denoted as (B1), the inner side on which the reflective-ink marking is printed may be opposite the façade of the light transferring medium.

(B3) The lighting assembly denoted as either (B1) or (B2) may include a lit state when the light source is on and an unlit state when the light source is off. The reflective-ink marking is illuminated in the lit state via the light source and in the unlit state via ambient light.

(B4) For the lighting assembly denoted as any of (B1) through (B3), the reflective-ink marking may include an image set printed on one or more layers of the light transferring medium arranged in a stackup such that light reflected off the reflective-ink marking frustrates through the light transferring medium to glow substantially homogenously in the lit state.

(B5) For the lighting assembly denoted as any of (B1) through (B4), the reflective-ink marking may provide an opaque appearance due to a dense application of ink in the marking.

(B6) For the lighting assembly denoted as any of (B1) through (B5), the reflective-ink marking may provide a translucent appearance due to a light application of ink in the marking.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A reflective-ink lighting assembly, comprising:
   a light transferring medium;
   a reflective-ink marking provided on the light transferring medium;
   a light source adapted to insert light into the light transferring medium in a lit state, such that the light propagates through the light transferring medium by total-internal reflection to illuminate the reflective-ink marking;
   in an unlit state, the reflective-ink lighting assembly is configured such that the reflective-ink marking remains visible in the presence of ambient light; and
   in the lit state, rays of light reflect off of the reflective-ink marking and out of a façade of the light transferring medium so that the reflective-ink marking is visible in the absence of ambient light.

2. The reflective-ink lighting assembly of claim 1, wherein the reflective-ink marking is applied via pad printing.

3. The reflective-ink lighting assembly of claim 1, wherein the reflective-ink marking is applied on an inner far side of the light transferring medium opposite a desired direction of light propagation.

4. The reflective-ink lighting assembly of claim 1, wherein the light source introduces light into the light transferring medium along an edge of the light transferring medium.

5. The reflective-ink lighting assembly of claim 1, wherein the light source includes one or more light-emitting diodes.

6. The reflective-ink lighting assembly of claim 1, wherein the light source includes an array of light-emitting diodes.

7. The reflective-ink lighting assembly of claim 1, wherein ambient light enters the lighting assembly via transparent or semi-transparent portions of the reflective-ink lighting assembly and reflects off the reflective-ink marking making it externally visible through the façade.

8. The reflective-ink lighting assembly of claim 1, wherein a beam pattern resulting from illumination in the lit state provides an intensity, a size, and a shape that meets legal automotive signal lamp photometric requirements.

9. The reflective-ink lighting assembly of claim 1, further comprising reflective ink printed on non-essential exit faces of a lighting assembly to increase a total amount of usable light by reflecting light back into the light transferring medium thereby increasing a light efficiency of the lighting assembly.

10. The reflective-ink lighting assembly of claim 1, wherein the reflective-ink marking further comprises an image set provided on the light transferring medium.

11. The reflective-ink lighting assembly of claim 10, wherein the image set is provided on a plurality of light transferring media layered upon one another to form a stackup of images.

12. The reflective-ink lighting assembly of claim 10, wherein the image set glows substantially homogenously when illuminated in the lit state.

13. The reflective-ink lighting assembly of claim 10, wherein the light source comprises colored light-emitting diodes providing a plurality of colors and the markings include color-matched inks to enable separate portions of the image set to be illuminated via the colored light-emitting diodes.

14. A lighting assembly, comprising:
   a reflective-ink marking printed on an inner side of a light transferring medium;
   a light source adapted to propagate light through the light transferring medium, wherein propagated light reflects off the reflective-ink marking and exits through a façade of the light transferring medium; and
   wherein, in a lit state, rays of light are frustrated out of a façade of the light transferring medium by reflecting off of the reflective-ink marking so that the reflective-ink marking glows substantially homogenously in the absence of ambient light.

15. The lighting assembly of claim 14, wherein the inner side on which the reflective-ink marking is printed is opposite the façade of the light transferring medium.

16. The lighting assembly of claim 14, further comprising a lit state when the light source is on and an unlit state when the light source is off, the reflective-ink marking being illuminated in the lit state via the light source and in the unlit state via ambient light.

17. The lighting assembly of claim 14, wherein the reflective-ink marking includes an image set printed on one or more layers of the light transferring medium arranged in a stackup.

18. The lighting assembly of claim 14, wherein the reflective-ink marking provides an opaque appearance due to a dense application of ink in the marking.

19. The lighting assembly of claim 14, wherein the reflective-ink marking provides a translucent appearance due to a light application of ink in the marking.

20. A lighting assembly having a light transferring medium and a reflective-ink marking provided on the light transferring medium, the lighting assembly comprising:
   a light source adapted to insert light into the light transferring medium in a lit state, such that the light propagates through the light transferring medium by total-internal reflection to illuminate the reflective-ink marking;
   the reflective-ink lighting assembly is configured such that, in an unlit state, ambient light enters the lighting assembly via transparent or semi-transparent portions of the reflective-ink lighting assembly and reflects off the reflective-ink marking making it externally visible through the façade; and
   reflective ink is disposed on portions of the lighting assembly so that a total amount of usable light is increased by reflecting light back into the light transferring medium, thereby increasing a light efficiency of the lighting assembly.

* * * * *